United States Patent
Bett et al.

(12) 
(10) Patent No.: US 6,253,159 B1
(45) Date of Patent: Jun. 26, 2001

(54) PROCESS CONTROL USING MULTIPLE DETECTIONS

(75) Inventors: Thomas Arthur Bett, Oshkosh; Tanakon Ungpiyakul; Gerald Bernard Arseneau, both of Neenah, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/246,440

(22) Filed: Feb. 8, 1999

Related U.S. Application Data

(60) Provisional application No. 60/114,481, filed on Dec. 31, 1998.

(51) Int. Cl.[7] .................................................... G01D 18/00

(52) U.S. Cl. ............................ 702/85; 702/159; 702/199

(58) Field of Search ................................... 702/35, 36, 40, 702/85–88, 90, 104, 108, 116, 150, 155, 159, 158, 179–181, 189, 198, 199

(56) References Cited

U.S. PATENT DOCUMENTS

| | | | |
|---|---|---|---|
| 4,514,846 | 4/1985 | Federico et al. | 371/16 |
| 4,837,715 | 6/1989 | Ungpiyakul et al. | 364/552 |
| 4,896,278 | * 1/1990 | Grove | 702/36 |

(List continued on next page.)

FOREIGN PATENT DOCUMENTS

| | | | |
|---|---|---|---|
| 0 485 691 B1 | 5/1992 | (EP) | B26D/5/34 |
| 2044792 | 5/1992 | (CA) | G05D/5/04 |
| 0 657 852 A2 | 6/1995 | (EP) | G06T/1/20 |
| 9081233 | 3/1997 | (JP) | G05B/23/02 |
| WO 93/07445 | 4/1993 | (WO) | G01B/21/14 |

OTHER PUBLICATIONS

Acquiring and Displaying Images, COGNEX, pp. 34–35, 136–138, 143, 146–148, 153–154, and 530. Date unknown.
"User's Manual Model 1012," Kodak Ektapro EM Motion Analyzer, Eastman Kodak Company, 1990. pp. 1.1–7.9.

Primary Examiner—Kamini Shah
Assistant Examiner—Craig Steven Miller
(74) Attorney, Agent, or Firm—Thomas D. Wilhelm; Jerad G. Seurer; Paul Y. Yee

(57) ABSTRACT

Methods of controlling manufacturing processes manufacturing, for example, absorbent articles. A target parameter to be measured is established, as are acceptable conditions of the target parameter. The target parameter is detected with first and second replications of determinations of the condition of the goods using multiple independent determinors, for example multiple sensors, or multiple replications using a common determinator, for example software instructions for analyzing a full digital vision image. Multiple determinations are taken at sites which are selected for their prospects for indicating acceptable conditions of the parameter. The method includes developing a measurement strategy, programming a computer to use appropriate analysis tools to evaluate the determination signals, transmitting the signals to the computer, and processing the signals according to an appropriate method. A given parameter can be inspected at respective duplicative sites, at spaced sites or multiple times at the same site. The parameter can be detected using three or more replications of the condition of the goods, optionally including processing signals from respective first and second parameters according to two or more different analytical methods. Averaging may or may not be an appropriate analytical method. The inspection system can compensate for various types of erroneous otherwise inappropriate signals and develop a corresponding response to respective process control devices. First and second replications can be taken at a common work station, or at spaced work stations. Preferably, the method measures parameters on every unit of goods fabricated or otherwise manipulated on the manufacturing line.

80 Claims, 1 Drawing Sheet

U.S. PATENT DOCUMENTS

| | | | |
|---|---|---|---|
| 5,045,135 | 9/1991 | Meissner et al. | 156/64 |
| 5,138,377 | 8/1992 | Smith et al. | 355/207 |
| 5,195,029 | 3/1993 | Murai et al. | 364/184 |
| 5,200,779 | 4/1993 | Nawata | 355/206 |
| 5,218,406 | 6/1993 | Ebner | 355/205 |
| 5,239,547 | 8/1993 | Tomiyama et al. | 371/16.4 |
| 5,251,273 | 10/1993 | Betts et al. | 382/57 |
| 5,286,543 | 2/1994 | Ungpiyakul et al. | 428/74 |
| 5,315,697 | 5/1994 | Nagamatsu | 395/155 |
| 5,333,062 | 7/1994 | Hara et al. | 358/437 |
| 5,359,525 | 10/1994 | Weyenberg | 364/469 |
| 5,365,310 | 11/1994 | Jenkins et al. | 355/202 |
| 5,388,252 | 2/1995 | Dreste et al. | 395/575 |
| 5,388,618 | 2/1995 | Decock | 139/1 R |
| 5,392,095 | 2/1995 | Siegel | 355/200 |
| 5,437,278 | 8/1995 | Wilk | 128/653.1 |
| 5,440,478 * | 8/1995 | Fisher et al. | 700/109 |
| 5,452,438 | 9/1995 | Umeda et al. | 395/180 |
| 5,467,355 | 11/1995 | Umeda et al. | 364/571.04 |
| 5,481,483 * | 1/1996 | Ebenstein | 382/152 |
| 5,490,089 | 2/1996 | Smith et al. | 364/514 R |
| 5,564,005 | 10/1996 | Weber et al. | 395/161 |
| 5,619,445 | 4/1997 | Hyatt | 365/45 |
| 5,629,872 * | 5/1997 | Gross et al. | 702/116 |
| 5,659,538 | 8/1997 | Stuebe et al. | 364/469.02 |
| 5,694,528 | 12/1997 | Hube | 395/113 |

* cited by examiner

PROCESS CONTROL USING MULTIPLE DETECTIONS

CROSS-REFERENCE TO RELATED APPLICATIONS

This application claims priority to Provisional Application Ser. No. 60/114,481 filed Dec. 31, 1998, now expired.

BACKGROUND

This invention relates to apparatus and methods for automatically monitoring and evaluating manufacturing processes, and goods made by manufacturing processes. The invention relates to, for example, operations which produce an ongoing stream of outputs such as discrete absorbent articles, for example disposable diapers, effective to absorb body fluids. Such absorbent article products are typically fabricated as a sequence of work pieces being processed on a continuous web, typically operating on a process line. Such absorbent article product generally comprises and absorbent core confined between a moisture impervious baffle of e.g. polyethylene and a moisture pervious body side liner of e.g. non-woven fibrous material. The absorbent articles are typically made by advancing one of the webs along a longitudinally extending path, applying the absorbent core to a first one of the webs, and then applying the second web over the combination of the first web and the absorber core. Other elements such as elastics, leg cuffs, containment flaps, waste bands, and the like are added as desired for the particular product being manufactured, either before, during, or after, applying the second web. Such elements may be oriented longitudinally along the path, or transverse to the path, or may be orientation neutral.

Typical such manufacturing processes are designed to operate at steady state at a pre-determined set of operating conditions. While the process is operating at steady state conditions, the result desired from the process is desirably and typically achieved. For example, where the process is designed to produce a certain manufactured good, acceptable manufactured goods are normally produced when the process is operating at specified steady state conditions.

As used herein, "steady state" conditions represents more than a single specific set of process conditions. Namely, "steady state" represents a range of specified process conditions which correspond with a high probability that acceptable goods will be produced, namely that the products produced will correspond with specified product parameters.

While a conventional such process is operating, sensors are typically used individually at various locations along the processing line to automatically sense various respective parameters with respect to the good being manufactured. For example, in a diaper manufacturing operation, a sensor such as a photoelectric eye may be used to sense the presence or absence of a particular element of the diaper such as an ear, the edges of a waist band, the leading edge of the absorbent core, or the like.

Known analytical models and control models are based on assumptions that errors related to such sensing are negligible, and thus that all determination signals, or absence of such determination signals, including quantitative signals, are in fact accurate representations of the elements purportedly being detected and/or measured.

However, actual operation of many manufacturing processes, including highly automated processes, typically includes the occurrence of periodic, and in some cases numerous, errors in the determination signals. Such errors may be caused by any of a variety of factors. Such factors may be, for example and without limitation, complete catastrophic failure of the sensor, intermittent failure of the sensor, error in sensor calibration, a transient out-of-calibration condition of the sensor, an effective obstruction between the sensor and the element to be sensed, or a loose or broken connection between the sensor and the computer or the other controller to which the sensor is connected, as well as numerous component and process irregularities.

A variety of possible events in the manufacturing operation can cause the production of absorbent articles which fall outside the specification range. For example, stretchable materials can be stretched less than, or more than, the desired amount. Elements can become misaligned relative to correct registration in the manufacturing operation, or improperly folded over, or creased, or crimped, or turn. Timing between process steps, or speed of advance of an element, can be out-of-tolerance. If such non-catastrophic changes in process conditions can be detected quickly enough, typically process corrections can be made, and the variances from target conditions can accordingly be controlled such that the product remains within accepted specification ranges, without having to shut down the manufacturing operation, and preferably without having to cull, and thereby waste, product.

A variety of automatic product inspection systems are available for carrying out routine ongoing automatic inspection of product being produced on a manufacturing line, and for periodically and automatically taking samples for back-up manual evaluation. Indeed, periodic manual inspection and evaluation of product samples is still important as a final assurance that quality product is being produced. However, in high-speed manufacturing processes, the primary tool for ongoing product inspection is one or more computer controlled automatic inspection systems which automatically, namely without direct human intervention, inspect the product being manufactured, preferably inspecting every unit of such product.

Where product is outside the accepted specification range, and should be culled, it is desired to cull all defective product, but only that product which is in fact defective. If too little product is culled, or if the wrong product is culled, then defective product is inappropriately released into the stream of commerce. On the other hand, if product which in fact meets accepted product specification is culled, then acceptable and highly valuable product is being wasted.

Body-fluid-absorbing absorbent articles such as are of interest herein for implementing the invention are typically manufactured at speeds of about 50 to about 1200 articles per minute on a given manufacturing line. Accordingly, it is impossible for an operator to manually inspect each and every article so produced. If the operator reacts conservatively, culling product every time he/she has a suspicion, but no solid evidence, that some product may not meet specification, then a significant amount of in-fact-good product will have been culled. By contrast, if the operator takes action only when a defect has been confirmed using visual or other manual inspection, defective product may have already been released into the stream of commerce before the defective condition has been confirmed.

One way for the operator to inspect the product for conformity with the specification range is for the operator to periodically gather and inspect, off-line, physical samples of the product being produced. Random such inspections stand little prospect of detecting temporary out-of-specification conditions. Where samples are taken by an operator in response to a suspected out-of-specification condition, given the high rate of speed at which such articles are manufactured, by the time the operator completes the inspection, the suspected offensive condition may have existed long enough that questionable or defective product will have either been shipped or culled without the operator having any solid basis on which to make the ship/cull decision. Further, automated manufacturing process controls may have self-corrected the defect condition before the operator can complete the visual inspection and act on the results of such visual inspection. Thus, conventional manual inspection by an operator, while potentially providing the highest level of inspection quality, has little prospect of effectively monitoring and controlling temporary out-of-specification conditions, or of pro-actively controlling processing conditions which run higher than average risk of producing out-of-specification product.

While off-line inspection can be a primary determinant of quality, and typically defines the final quality and disposition of groups of the product, on-line inspection, and off-line evaluation of on-line-collected data, typically associated with certain manufacturing events, may provide valuable insight into both the operational characteristics of the manufacturing process and the final quality parameters of the product, as well as insight into potential pro-active improvements in process control.

Thus, in processes that operate at speeds such that manual inspection of each unit of product is an unrealistic expectation, the primary mechanism for inspecting each unit of product is one or more computer controlled automatic inspection and control system, backed up by periodic manual inspections to confirm the accuracy of the decisions being made by the automatic inspection and control systems. Such automatic inspection and control system automatically, namely without direct human intervention, inspect the product being manufactured, preferably inspecting every unit of such product.

Automatic inspection and control systems rely on a plurality of sensing devices and analytical tools to detect a corresponding plurality of different, pre-selected parameters, qualitatively and typically quantitatively, in the goods being produced. Such pre-selected parameters are selected for their prospects of representing the actual overall degree to which the goods confirm to pre-selected specifications. Accordingly, the conclusions reached, and the control actions taken on the basis of such conclusions, are only as reliable as the determination signals created and/or developed by the respective sensing devices and analytical tools. The reliability of such determination signals is thus critical to the ability of the automatic inspection and control system to sufficiently and efficiently control the manufacturing operation.

While sensors and analytical tools are readily available for use in automatic inspection and control systems, typical such sensors and analytical tools must be carefully manipulated, such as positioned, mounted, calibrated, programmed, and the like, and so maintained in a manufacturing environment.

As a practical matter, such sensors and tools periodically develop and/or transmit erroneous determination signals, in spite of a regular maintenance program. In typical situations, the inspection and control system is unable to detect the fact that such signals are erroneous signals, whereby the inspection and control system fails by responding, erroneously, as though the signals were in fact accurate, or fails by not responding at all. Such erroneous responses can result in the control system being the cause of product being in fact out-of-specification. Namely, since the automatic control system manages first level inspection decisions, an error in the control system can actually result in release and shipment of product which does not meet accepted specification ranges. So it is critical that the incidence of errors, particularly erroneous determination signals, be limited as much as possible.

As indicated above, there are both advantages and limitations to automatic inspection and control systems. A significant advantage is that the speed of analysis enables such system to inspect each and every unit being fabricated on manufacturing lines that produce up to about 1200 units per minute. Such automatic inspection and control systems are required where rate of product manufacture exceeds the rate of reasonable human/manual inspection, even allowing for multiple humans to do inspections.

a limitation of automatic inspection and control system is that, while such systems conventionally may have the ability to distinguish an accurate determination signal from an erroneous determination signal, they cannot compare, correct, or compensate for erroneous signals. And while erroneous signals do not happen often enough to suggest that such automatic inspection and control systems have no net value, to the extent the incidence of erroneous signals can be reduced, or to the extended the incidence of accepting erroneous signals as accurate can be reduced, the value of such automatic inspection and control systems will be enhanced.

It is an object of this invention to provide improved inspection and control systems, and methods of measuring parameters so as to increase reliability of the decisions made from processing of the determination signals created and/or developed by such inspection and control systems.

It is another object to provide inspection and control systems, and methods of use, which effectively analyze the determination signals and automatically correct for certain defective signals and signal conditions.

It is yet another object to provide inspection and control systems, and methods of use, which effectively modify the determination signal input when the control system detects a defect in the signal.

It still another object to provide inspection and control systems, and methods of use, which detect out-of-calibration sensors and/or analytical tools, and automatically recalibrate such sensors and/or tools.

It is a further object to provide inspection and control systems which automatically implement back-up inspection of the goods associated with defective determination signals.

It is an overall object to provide inspection and control systems which reduce the incidence of erroneous signals being provided to the controller of the manufacturing operation.

It is a more specific object to provide inspection and control system which reduce the incidence of erroneous signals being accepted as accurate by the controller of the manufacturing operation.

SUMMARY

This invention contemplates a method of measuring a parameter of goods being fabricated in a manufacturing operation. The method comprises establishing a target parameter to be measured on the goods, and acceptable conditions of the target parameter. The method develops a measurement strategy for measuring the target parameter;

and detects the target parameter with respective at least first and second separate and distinct replications of determinations of the condition of a segment of a unit of the goods using at least one of multiple independent determinors or a common determinor taking multiple determinations at corresponding multiples sites on the unit of goods. Each of the sites desirably indicate a common acceptable condition of the target parameter. The method thus develops respective at least first and second separate and distinct replicate determination signals representative of the target parameter on the unit of goods. Subsequent to developing the measurement strategy, the method contemplates programming a user-programmable computer to use an appropriate analysis method to evaluate the determination signals, transmitting the determination signals to the user-programmable computer for analysis, and processing the determination signals in the user-programmable computer so as to use the respective analysis method to analyze the determination signals so received for conformity to the established acceptable conditions.

Some embodiments include detecting the target parameter with respective at least first and second separate and distinct replications of determination for at least first and second parameters at respective duplicative sites on the unit of goods.

Some embodiments include processing the determination signals so as to use first and second different analytical methods to analyze the determination signals representative of the respective first and second parameters.

Some embodiment include detecting the target parameter using respective at least first, second, and third separate and distinct replications of determinations of the condition of the unit of goods, optionally for at least first and second parameters at respective replication sites on the goods, optionally including processing the determination signals from the respective first and second parameters so as to use respective first and second different analytical methods to analyze the determination signals representative of the respective first and second parameters.

The methods can include detecting the target parameter using first and second separate and distinct sensors, optionally selected from the group consisting of electric eye sensors, infrared sensors, motion sensors, temperature sensors, cameras, and ultraviolet and visible spectrum light sensors.

A variety of analytical methods can be used to process the determination signals, for example computing an average of the three signals, determining the number of the signals, of the unit of goods, having common or nearly common signal duration, or computing a standard deviation based on the determination signals. When the analysis and/or other processing of the determination signals comprises concluding that a given one of the determination signals is erroneous, the method can include, automatically and according to programmed instructions, modifying the signal combination to compensate for the erroneous signal.

The processing of the signals can include comparing the signals either alone or in combination to an existing database of known and/or expected signal combinations. Such database optionally includes a historical probability of the occurrence of respective ones of the combinations. Based on the comparison of the determination signals to the database of signal combinations, the method develops a conclusion as to cause of any anomaly in the signal combination, and develops a corresponding response to the signal combination. Such anomaly can, for example and without limitation, represent anomalies in the product being fabricated, anomalies in detection of the parameter of interest, anomalies in sensor receipt and/or processing of the parameter detection, anomalies in sensor set-up anomalies in sensor calibration, and the like.

The methods can include transmitting the computed response as a control signal to a process controller controlling the manufacturer operation, and thence to process control devices which physically make adjustments to the operation of the manufacturing process.

The methods can include, when the analysis detects an out-of-calibration condition in one of multiple independent determinors, automatically recalibrating the out-of-calibration determinor.

The methods can include, when the analysis detects indeterminate or otherwise inappropriate input from one of multiple independent determinors, automatically adjusting the analysis to a basis of one less determinor, and/or automatically implementing back-up inspection of goods associated with the inappropriate of input, and/or automatic culling of product.

The invention generally comprehends a manufacturing operation wherein a manufacturing line has a plurality of work stations, and wherein the first and second replications can be taken at a common such work station, or wherein a second replication is taken at a work station spaced from, for example downstream of, the work station at which the first replication is taken. Typically, the method comprises analyzing sequential ones of the units of the goods on the manufacturing line.

In a more specific second family of embodiments, the invention comprehends a method of measuring a parameter of goods, such as absorbent articles, being fabricated in a manufacturing operation. The method comprises establishing a target parameter to be measured on respective units of the goods, and acceptable conditions of the target parameter, developing a measurement strategy for measuring the target parameter, and detecting the target parameter in a unit of the goods with respective at least first and second separate and distinct sensors. The sensors thereby develop respective at least first and second separate and distinct replicate determination signals representative of the target parameter in the unit of goods. Subsequent to developing the measurement strategy, the method contemplates programming a user-programmable computer to use an appropriate analysis method to evaluate the determination signals, transmitting the determination signals to the user-programmable computer so as to provide the computer with first and second separate and distinct determination signals, and analyzing the determination signals in combination, in the user-programmable computer, for conformity of the unit of goods to the established acceptable conditions, utilizing the respective appropriate analysis method.

In a third family of embodiments, the invention comprehends a method of measuring a parameter of an absorbent article being fabricated in a manufacturing operation manufacturing such absorbent articles. The method comprises establishing a target parameter to be measured on respective units of the absorbent articles, and acceptable conditions of the target parameter, and detecting the target parameter on a respective absorbent article with respective at least first and second separate and distinct sensors. The sensors thereby develop respective at least first and second separate and distinct replicate determination signals representative of the target parameter on the respective absorbent article, transmitting the determination signals to a controller so as to provide the controller with first and second separate and distinct determination signals, and analyzing at least some of the determination signals in combination, in the controller, for conformity of the respective absorbent article to established acceptable conditions, utilizing an appropriate analysis method other than averaging the respective determination signals.

Figure 1:
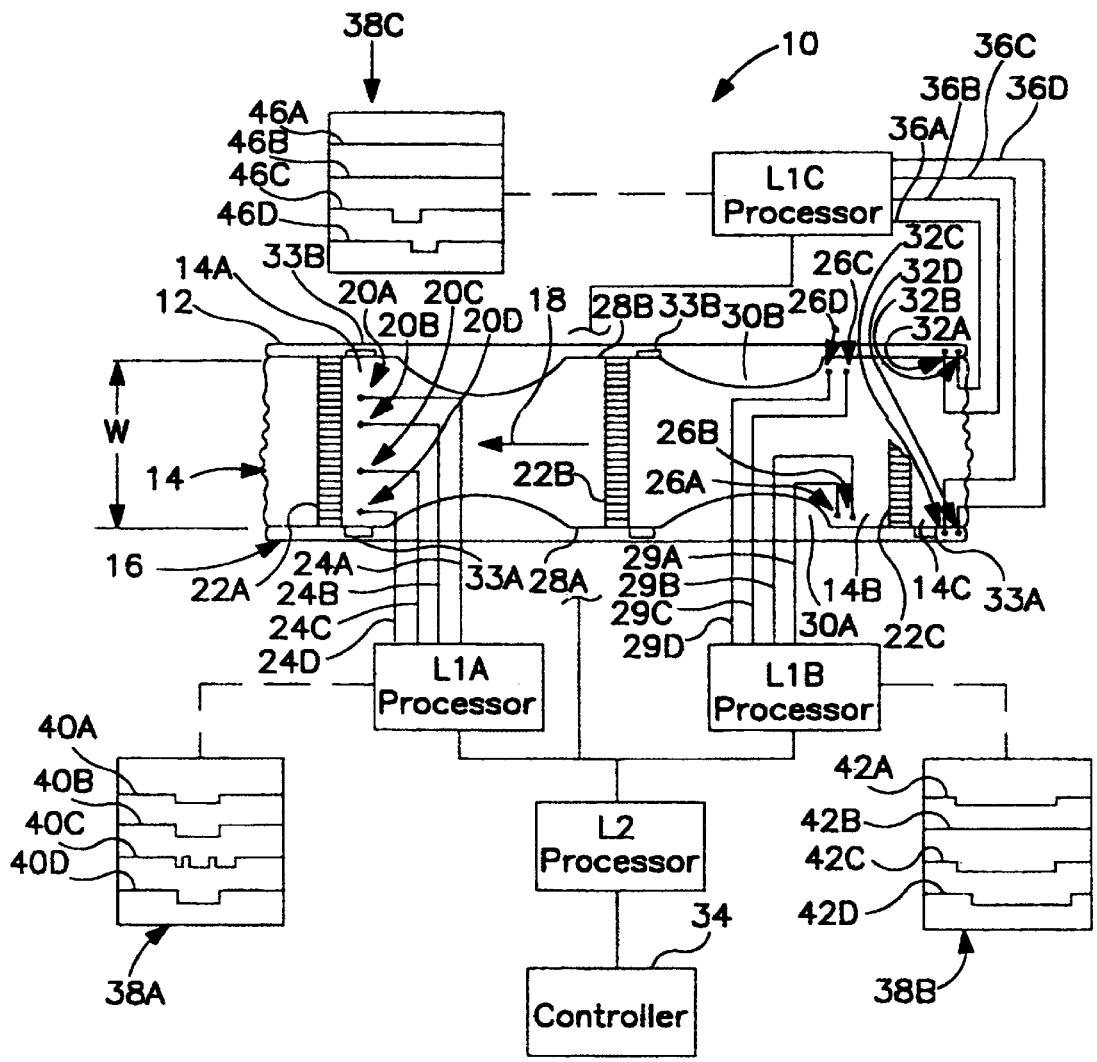
FIG. 1 is a representative top view and block diagram of a portion of an inspection and control system of the invention utilizing multiple sensors.

The invention is not limited in its application to the details of construction or the arrangement of the components set forth in the following description or illustrated in the drawings. The invention is capable of other embodiment or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

A portion of an inspection and control system 10 of the invention is illustrated in FIG. 1, operating in combination with a manufacturing line 12 which fabricates disposable diapers 14 as a continuous web sausage 16 containing various diaper elements. The illustrated manufacturing line 12 includes various machines (not shown) which feed and guide various elements of the diapers, and position and fix the various elements, at appropriate locations and in appropriate orientations, onto a continuous supporting web (not shown) which eventually becomes either the body side liner of the diaper or the outer cover of the diaper. The portion of the manufacturing line which is shown is representative of locations closer to the end of the manufacturing line than to the beginning. In the embodiment shown in FIG. 1, movement of continuous web sausage 16 is from right to left as illustrated at arrow 18.

Sensors 20A, 20B, 20C, 20D are arrayed across the width "W" of continuous sausage 16, and are typically located above the level of the elements on the manufacturing line, here above diaper 14A, for a spaced, no-contact, sensing of a parameter of interest. Sensors 20A, 20B, 20C, 20D are identical sensors, for example electric eye sensors, and are positioned and arrayed for all sensors 20A, 20B, 20C, 20D to sense the same parameter, property of the diaper at that machine-direction location one the manufacturing line. Electric eye sensors such as those illustrated are either on or off, whereby signal magnitude is typically not a variable parameter. However, electronic filters are typically used to reduce as much as possible the effects of electronic noise, such that noise does not inappropriately produce "on" signals. Other types of sensors can produce signals wherein signal magnitude is a variable.

In the illustrated example, sensors 20A, 20B, 20C, 20D are positioned and arrayed to sense the location of waist band 22A adjacent the leading edge of diaper 14A. Sensors 20A, 20B, 20C, 20D are connected to first level processor "L1A" by respective transmission lines 24A, 24B, 24C, 24D.

Sensors 26A, 26B, 26C, 26D are arrayed along left and right sides 28A, 28B respectively of continuous sausage 16, and are typically located above the level of the elements on the manufacturing line, here above diaper 14B, for a like spaced sensing of a parameter of interest. Sensors 26A, 26B, 26C, 26D are identical sensors, for example electric eye sensors, and are positioned and arrayed for sensors 26A, 26B to sense the left leg cutout 30A, and for sensors 26C, 26D to sense right leg cutout 30B. Sensors 26A, 26B, 26C, 26D are connected to first level processor "L1B" by respective transmission lines 29A, 29B, 29C, 29D.

Sensors 32A, 32B, 32C, 32D are arrayed along left and right sides 28A, 28B respectively of continuous sausage 16, and are typically located above the level of the elements on the manufacturing line, here above diaper 14C. Sensors 32A, 32B, 32C, 32D are identical sensors, for example electric eye sensors, and are positioned and arrayed for sensors 32A, 32B, to sense right attachment ear 33B, and for sensors 32C, 32D to sense left attachment ear 33A. Sensors 32A, 32B, 32C, 32D are connected to first level processor "L1C" by respective transmission lines 36A, 36B, 36C, 36D.

First level processors "L1A," "L1B," and "L1C" are all connected to second level processor "L2" which is in turn connected to the main controller of the manufacturing operation, namely controller 34. Processors "L1A," "L1B," and "L1C" receive and evaluate the multiple determination signals from the respective sensors. Processor "L2" receives and evaluates resultant signals from e.g. processors "L1A," "L1B," L1C" in assessing the overall quality condition of the good being inspected.

Controller 34 can represent a user-programmable computer or computer system which exercises overall control of the manufacturing line, including receiving inspection signals from processor "L2." Processor "L2" represents a computer which analyzes inputs from processors "L1A," L1B," and L1C" exercises overall control of the inspection system while controller 34 exercises overall control of the inspection and control system.

In the alternative, the first and second level processors, and controller 34, can be embodied in a single control unit which provides all of the above-recited computation and control functions. A typical such control unit is generally referred to as, for example, a process controller, having a computer embedded therein, with or without addition of one or more personal computers into the architecture of the process controller. Thus, the architecture of the computation and control system can be designed with significant levels of freedom, and wherein a variety of computer/controller architectures are acceptable for use in the invention.

Inspection system 10 includes a variety of sensors and processors, all connected directly or indirectly to processor "L2." Namely, a variety of sensors in addition to the sensors shown, can be positioned at various locations along the manufacturing line wherever automatic inspection readings are to be taken by automatic inspection and control system 10, and are connected directly or indirectly to processor "L2." All such sensors are arranged in groups of at least 2, preferably at least 3. Where greater than 3 sensors can be used, for example up to 6, 8, or even 10 sensors, the reliability of the combined determination signals is significantly enhanced. While single sensors can still be used for some selected sensings in systems of the invention, such use of single sensors is best limited to situations where the overall reliability of the detections is high.

The sensors can be any sensors capable of detecting a desired parameter of the diaper, for example and without limitation electric eye sensors, infrared sensors, temperature sensors, cameras, or light sensors. Suitable processing software is provided in the respective first level processors to convert the received signals, as necessary, into language understandable to processor "L2." Where the option of a sensor is already compatible with processor "L2," no language conversion is necessary.

FIG. 1 further contains graphs 38A, 38B, 38C illustrating the raw data, namely the determination signals, reported by the respective sensors. Referring now to graph 38A of FIG. 1 and sensors 20A–20D, the respective sensors are arrayed across the width of manufacturing line 12 for sensing the presence and locations of the waist bands, such as waist bands 22A, 22B, 22C on respective diapers 14A, 14B, 14C.

Referring again to FIG. 1, noting the direction of movement indicated by arrow 18, and the relative position of waist band 22A, waist band 22A has already passed sensors 20A–20D whereby the respective sensors have already transmitted their respective determination signals to processor "L1A."

Each of determination signals 40A, 40B, and 40D in graph 38A shows two distinct step changes, first down, then up, in the signal outputted from the respective sensor, indicating the presence and location of waist band 22A. Signal 40C shows six distinct step changes, representing a signal containing an abnormal amount of noise. All of signals 40A–40D are indeed shown as idealized charts in the drawing, thus ignoring the normal amount of actual signal noise typically present in such sensing signals associated with manufacturing operations. A significant value of the invention is the ability to compare e.g. signals 40A–40D to each other, to thereby identify a particular signal as abnormally noisy, and to still have enough other data to work with that a suitable inspection conclusion can still be reached.

The ordinate axis of graph 38A merely illustrates the change in signal intensity, not the absolute signal intensity, itself. The abscissa axis of graph 38A indicates passage of time.

The fact that three of the four signals experienced the step changes at the same times indicates that the three sensors sensed the leading and trailing edges of the waist band at the same time. As with any arrangement of multiple sensors, the meaning of the representation on the time axis is highly dependent on the relative locations of the sensors on the manufacturing line. Such positioning is programmed into processor "L1A" or "L2," or both, in order to take into proper account the relative positioning of the sensors with respect to time. The overall evaluation of the information developed by the four signals in graph 38A, in combination, is that waist band 22A is probably present across the width of sausage 16, and that the waist band is properly located longitudinally on the sausage. The noise in signal 40C is cause for concern such that the operator may be alerted to the aberrant condition. Further analysis is consider the number of units in sequence that report noise on signal 40C, whether any other signals report inappropriate sensings, and the like.

Referring now to graph 38B of FIG. 1 and sensors 26A–26D, sensors 26C, 26D are positioned longitudinally with respect to each other on the right side of diaper 14B, and are aligned for detecting the presence and location of leg cut-out 30B. Sensors 26A, 26B are positioned longitudinally with respect to each other on the left side of diaper 14B, and are aligned for detecting the presence and location of leg cut-out 30A.

Referring again to FIG. 1, noting the direction of movement indicated by arrow 18, and the relative positions of leg cut-outs 30A and 30B, both such leg cut-outs have already passed sensors 26A–26D whereby the respective sensors have already transmitted their respective determination signals to processor "L1B."

Determination signal 42A shows the expected two distinct step changes in the signal outputted from sensor 26A, indicating that leg cut-out 30B is present in the proper location. Determination signal 42B from sensor 26B has no indication that leg cut-out 30B is present. Thus, given that we can see from diaper 14B in FIG. 1 that leg cut-out 30B is in fact present, we know that determination signal 42B is defective. Separate from our ability to physically see diaper 14B, we know from determination signal 42A that signals 42A and 42B are giving different indications. Accordingly, where there are only 2 signals, and wherein one of the signals is out of specification, processor "L1A" provides a respective out-of-tolerance signal to processor "L2" which in turn transmits the respective information to controller 34. One of processor "L1A," "L2," or controller 34 takes action to identify the group of product fabricated under the given conditions, and to have samples saved for manual inspection of the leg cut-outs. The operator can do the manual inspection, determine that the product is acceptable, and then trouble-shoot the inspection system, discover the cause of the defective signal, and take corrective action.

By contrast, if only one sensor was being used, and only the defective signal 42B was received, the inspection and control system would automatically conclude that the product was defective, and cull the product.

Meantime, determination signal 42C shows the expected two distinct step changes in the signal outputted from sensor 26C, indicating that leg cut-out 30A is present in the proper location. Determination signal 42D also shows the expected two distinct step changes in the signal, with the small delay in the timing of the step because of the position of sensor 26D slightly downstream of sensor 26C.

As in graph 38A, the ordinate axis of graph 38B merely illustrates change in signal intensity, not absolute signal intensity, itself. Also as in graph 38A, the abscissa axis of graph 38B indicates passage of time. Accordingly, the slight delay in step changes in signal 42D, compared to signal 42C, represents a general principle regarding the timing of the signals relative to the corresponding positioning of the sensors with respect to each other. Such positioning is programmed into processor "L1B" or "L2," or both, in order to take into proper account the relative positioning of the sensors.

The overall evaluation of the information developed by the four signals in graph 38B, in combination, is a two-part conclusion. First, processor "L1B" responds to the combination of signals 42A, 42B by issuing a signal directing manual inspection of the associated units of product, to determine whether leg cut-outs 30B are in fact present, and in the proper positions. If desired, inspection and control system 10 can also segregate the associated product until such time as the operator makes the determination whether the product is in fact acceptable or defective. Further, system 10 can send a signal to the operator advising of the anomalous reading.

Second, since both sensors 26C and 26D provide signals 42C, 42D, consistent with each other, namely both signals indicate an acceptable condition of leg cut-out 30B, and both signals indicate the leg cut-out at the same location, processor "L1B" takes no corrective action in response to signals 42C, 42D.

Referring again to FIG. 1, noting the direction of movement indicated by arrow 18, and the relative positions indicated for the diaper ears 33A, 33B, the prospective locations for both such ears have already passed sensors 32A–32D whereby the respective sensors have already transmitted their respective determination signals to processor "L1C."

Determination signals 46A and 46B give no indication that an ear is present. And in fact no ear 33B is present on diaper 14C. Thus, signals 46A, 46B deliver a consistent message that the ear is missing from diaper 14C. Given the duplicative defect signals 46A, 46B, system 10 automatically culls each such defective product. According to the duplicative signals, the operator can have a high degree of confidence that the unit of product is in fact defective, and that the culling of the respective product has a high probability of culling defective product and not acceptable product. While the operator could choose to manually inspect the respective units of product, such manual inspection would have a relatively lower priority because both determination signals indicate the same defect conditions, namely the absence of ear 33B.

Meantime, determination signals 46C, 46D show the expected two distinct step changes in the respective signals outputted from sensors 32C, 32D indicating that ear 33A is present in the proper location on diaper 14C. Determination signal 46D shows the expected small delay in the timing of the step because of the position of sensor 32D slightly downstream of sensor 32C.

As in graphs 38A and 38B, the ordinate axis of graph 38C merely illustrates change in signal intensity, not absolute signal intensity, itself. Also as in graphs 38A and 38B, the abscissa axis of graph 38C indicates passage of time. Accordingly, the slight delay in step changes in signal 46D, compared to signal 46C, again represents the general principle regarding the timing of the signals relative to the corresponding positioning of the sensors with respect to each other. Such positioning is programmed into processor "L1C" or "L2," or both, in order to take into proper account the relative positioning of the sensors.

The overall evaluation of the information developed by the four signals in graph 38C, in combination, is a two-part conclusion. First, processor "L1C" determines that ear 33B is missing from diaper 14C, and responds by issuing a signal directing culling of diaper 14C for optional later inspection. However, the operator's attention can better be used to monitor the ongoing automatic inspection of product. If the automatic inspection and control system detects additional and sequential units of product without ears, the more general corrective action is taken to prevent continuation of the defect condition.

Second, since both sensors 32C and 32D provide signals 46C, 46D, consistent with each other, namely both signals indicate an acceptable condition of ear 33A, and both signals indicate the ear at the same location, processor "L1C" takes no corrective action as a result of signals 46C, 46D.

Sensors 20A–20D, 26A–26D, and 32A–32D illustrate the principles of using groups of multiple sensors wherein each group of sensors senses a single respective parameter, or condition, of the goods being manufactured. For example, the four sensors 20A–20D sense a single parameter, namely the condition of the waist band. The two sensors 26A–26B sense a single parameter, namely the condition of leg cut-out 30A. The two sensors 26C–26D sense a single parameter, namely the condition of leg cut-out 30B. The two sensors 32A–32B sense a single parameter, namely the condition of ear 33B. The two sensors 32C–32D sense a single parameter, namely the condition of ear 33A.

The illustrated sensors also illustrate that automatic inspection and control system 10 can, on an ongoing and continuous basis, be simultaneously sensing, processing, and responding to, a variety of such parameters or conditions of the goods being fabricated. Namely, processor "L2" and controller 34 can receive signals 40A–40D, 42A–42D, and 46A–46D in any order, for any ongoing number of units of goods being manufactured on line 12.

As the system receives the several signals, the signals are processed for conformity with the signals expected. When a signal is out of tolerance, the system the looks for a confirming signal from one or more replicate sensors sensing the same parameter of the same unit of goods. If the signal is confirmed, the unit of goods is generally automatically culled. For example, waist band 22C is torn about mid-way along the width of sausage 16. If only a single sensor, for example sensor 20D, were being used to detect waist bands, an erroneous "accept" signal would be received by processor "L1A." If only sensor 20A were being used, there would be no detection at all of waist band 22C. By using 4 sensors 20A–20D, the actual condition of waste band 22C is better recorded.

Where smaller, namely non-catastrophic, deviations from target conditions are detected, controller 34 can typically take corrective action by directing changes in the process settings thus to effect process changes that direct the product conditions back toward target conditions, thus to avoid culling and/or shut-down.

Depending on the number of units culled automatically, the operator may or may not be alerted to the cull action. Namely, if a cull is an isolated incident, the operator generally need not be alerted. However, if a number of units are being culled, or if a high fraction of the units are being culled, then the operator is alerted. The actual threshold condition according to which the operator is alerted, is a matter of choice, and is programmed into one or more or processor "L2" or controller 34.

Returning again to FIG. 1, where three or more sensors are sensing a single parameter, and where an aberrant reading is received from a sensor, statistical analytical methods can be used to logically determine the actual condition of the unit of goods, and can in some circumstances be used to determine the condition of the sensor transmitting the aberrant reading. For example, if any two of the three sensors make the same report, there is an increased probability that the two sensors are providing accurate information and that the information provided by the third sensor is in fact defective information. Such instance leaves open the question of what is the condition of the sensor providing the aberrant signal.

Where one sensor provides no detect indication or only a noise signal where the product element is to be detected, and where the other sensors provide positive detect signals, the one sensor may be fatally defective, or may need repair, or an object or dirt or dust may be blocking or otherwise interfering with the sensor making the reading. Meantime, the consistent readings from the remaining multiple sensors confirm the acceptability of the goods while the operator takes appropriate action to bring the aberrant sensor back into effective operation.

Controller 34 and optionally processor "L2" are user-programmable computers, such as personal computers, or the combination of controller 34 and processor "L2" can be contained in a single physical structure/computer housing, optionally along with one or more of the "L1" processors. One or both of processor "L2" or controller 34 is programmed with instructions for the handling of aberrant signals according to the types of aberrations. For example, where the aberrant signal is only a little different from the readings of the remaining sensors, the respective sensor may be out of calibration, and the respective computer can automatically recalibrate the respective sensor based on the readings of the remaining two or more sensors.

Further, where one sensor indicates a total absence of the respective element, and the remaining sensors provide strong indications of presence of the element, and in light of other facts in the situation, the instructions pre-programmed into the computer may instruct to conclude that the aberrant reading is in fact an error, and to analyze the signals on the basis of one less sensor, while alerting the operator to investigate the situation.

In some instances, the particular element of interest can be difficult for the sensors to detect, whereby the sensors may need frequent calibration. Where a particular one of the sensors repeatedly transmits no detect signal, or a weak detect signal, the system can automatically recalibrate the respective sensor to enhance its ability to detect the element of interest.

For example, in some instances, after the top web, whether body side liner or baffle, has been placed over the absorbent core, the absorbent core may be difficult to detect, depending on the type of sensor being used to detect the absorbent core. In such case, calibration of the sensor may be critical to proper detection of the absorbent core. In cases where such sensor requires frequent calibration, the computer can be programmed to recognize an out-of-calibration condition of the sensor, or an inappropriate signal from the sensor, and to respond to such anomalous behavior by automatically recalibrating the aberrant sensor such that calibration can be ruled out as a variable in signal evaluation. Such situations of automatic calibration, of course, require periodic manual confirmation that the automatic calibrations are in fact assisting the sensors in detecting actual conditions of the goods on the manufacturing line.

In keeping with the illustrated embodiments, typically the replicate sensors take the replications at a common work station on the manufacturing line, preferably at closely-spaced locations, in some instances as close as possible given the physical size limitations of the respective sensors such that the replication sites can be as close to identical, both in location and time, as possible. Since sensors are now available in miniaturized sizes, typically sensors such as electric eyes can be located within 10 mm of each other. Other sensors, such as fiber optics can be located within 2 mm or less of each other. Where practical, replicate sensors can be aimed at identical spots on the unit of goods, optionally simultaneously, whereby preciseness of replication, and thus reliability of the conclusions of automatic system 10, can be enhanced.

On the other hand, where sufficiently precise registration is available, a replicate reading of an individual parameter can be taken at a subsequent work station downstream of the work station where the first reading was taken. However, concerns about precision of the registration generally suggest against taking replication readings in separate work stations wherever the replicate readings can be taken in a common work station. In general, the closer in time and location are the readings of a given parameter on a given unit of goods, the more reliable the replicate readings for purposes of identifying defective sensors.

Where two or more parameters are being evaluated by the inspection and control system, the respective computer or computers can use different analytical methods, statistical methods, non-statistical methods, or a combination of statistical and non-statistical methods, to analyze and evaluate the different signals received from the respective sensors and measuring the respective different parameters. In some instances, the analytical method of choice is to average the determination signals. In other instances, an average is not the best analytical tool and the analytical method of choice can be, for example, to determine the number of signals of common or nearly common signal duration, and to use only those signals for the remainder of the analysis of that unit of goods. In yet other instances, the analytical method of choice is to compute a standard deviation, and proceed on the basis of whether the standard deviation indicates defective product.

In some instances, the analytical method includes statistical analysis such as comparing the signal combination (the signals from the several sensors) to a database of known and/or expected signal combinations, optionally including a historical probability of the occurrence of respective ones of the combinations, and based on the comparison, developing a conclusion as to probable cause of any anomaly in the signal combination, and developing a corresponding response to the signal combination.

In the alternative, both here and in all the above analytical methods, both fuzzy logic and/or other alternative decision theories can be used in arriving at conclusions as to probable cause of an anomaly in the signal combination and developing a corresponding response, and can be used in combination with each other as well as with more conventional statistical analytical methods.

Whatever the conclusion of the inspection and control system to an aberrant signal, the conclusion is typically generated by or transmitted to controller 34, and appropriate responses are transmitted from controller 34 as control commands to the processing machinery, such as to drive units, feed units, steering units, placement units, take-off units, and the like.

As with any manufacturing operation, the higher the fraction of the goods which are actually inspected, the greater the reliability of the results of such inspections. Similarly, the greater the number of parameters inspected on each unit of the goods, the greater the reliability of the results of such inspections. Further, the greater the number of readings for a given parameter, the greater the reliability of the conclusion that the respective reading can be relied on in assessing the actual condition of the parameter being measured.

Accordingly, the invention contemplates taking a number of readings, preferably at least three readings, for each parameter to be measured for each unit of goods being fabricated, and taking such readings for a number of parameters typical of the number of parameters evaluated during manufacture of such goods. There is, of course, a practical limit to the number of parameters which can be read, and to the number of sensors, and the amount of computing capacity and computer memory, that can be applied to collecting the data, and storing the data so collected, whereby judicious decisions must be made with respect to how much information will actually be collected, analyzed, and stored for later manual review and evaluation.

A primary advantage of the invention is that erroneous determination signals from a single sensor do not cause the inspection and control system to improperly cull acceptable product, or to accept defective product. On the contrary, based on the replicate determination signals, in some instances, the control system can automatically correct the sensor. In some instances, the control system can determine that the error signal is in fact a sensor error. In yet other instances, the control system can alert the operator to a high risk set of units of product.

Overall, the invention provides a control system which more accurately determines the actual condition of the goods, and better identifies sets or batches of goods which represent relatively higher risk of containing relatively higher fractions of defective goods.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A method of measuring a parameter of goods during fabrication of such goods in a manufacturing operation, the method comprising:
   (a) establishing a target parameter to be measured on the goods, and acceptable conditions of the target parameter;
   (b) developing a measurement strategy for measuring the target parameter;
   (c) detecting the target parameter with respective at least first and second separate and distinct replications of determinations of the condition of the established target parameter on a segment of a unit of the goods at a given stage of development of the target parameter on the goods, using at least one of multiple independent determinors or a common determinor taking multiple real time determinations of the established target parameter at corresponding multiple sites on the unit of goods which sites desirably indicate, in combination, a common acceptable condition of the target parameter, and thereby developing respective at least first and second separate and distinct replicate determination signals representative of the target parameter on the unit of goods;
   (d) subsequent to developing the measurement strategy, programming a user-programmable computer to use an analysis method capable of assessing accuracy of determinor sensory input pertaining to the target parameters to evaluate the determination signals;
   (e) transmitting the determination signals to the user-programmable computer for analysis; and
   (f) processing the determination signals in the user-programmable computer so as to use the respective analysis method to analyze the determination signals so received for conformity to the established acceptable conditions.

2. A method as in claim 1, including detecting the target parameter with respective at least first and second separate and distinct replications of determinations for at least first and second parameters at respective duplicative sites on the unit of goods.

3. A method as in claim 2, including processing the determination signals so as to use first and second different analytical methods to analyze the determination signals representative of the respective first and second parameters.

4. A method as in claim 1, including detecting the target parameter using respective at least first, second, and third separate and distinct replications of determinations of the condition of the unit of goods.

5. A method as in claim 4, processing of the determination signals comprising computing an average of the three signals.

6. A method as in claim 4 wherein, when the analysis detects an out-of-calibration condition in one of multiple independent determinors, automatically recalibrating the out-of-calibration determinor.

7. A method as in claim 4 wherein, when the analysis detects inappropriate input from one of multiple independent determinors, automatically adjusting the analysis to a basis of one less determinor.

8. A method as in claim 7, including automatically implementing back-up inspection of goods associated with the inappropriate input from the one determinor.

9. A method as in claim 1 including detecting the target parameter using respective at least first, second, and third separate and distinct replications of determinations for at least first and second parameters at respective replication sites on the unit of goods.

10. A method as in claim 9, including processing the determination signals from the respective first and second parameters so as to use respective first and second different analytical methods to analyze the determination signals representative of the respective first and second parameters.

11. A method as in claim 1, including detecting the target parameter using first and second separate and distinct sensors.

12. A method as in claim 1, including detecting the target parameter using first and second separate and distinct sensors selected from the group consisting of electric eye sensors, infrared sensors, motion sensors, temperature sensors, cameras, and light sensors.

13. A method as in claim 1, processing of the determination signals comprising determining the number of the signals, for the unit of goods, having common or nearly common signal duration.

14. A method as in claim 1, processing of the determination signals comprising computing a standard deviation based on the determination signals.

15. A method as in claim 1 wherein, when analysis of the determination signals comprises concluding that a given one of the determination signals is erroneous, the method includes modifying the signal combination to compensate for the erroneous signal.

16. A method as in claim 1, including comparing the signal combination to an existing database of signal combinations, and based on the comparison, developing a conclusion as to cause of anomaly in the signal combination, and developing a corresponding response to the signal combination.

17. A method as in claim 16, including transmitting the response as a control signal to a process controller controlling the manufacturing operation.

18. A method as in claim 1, including comparing the signal combination to an existing database of signal combinations, including a historical probability of the occurrence of respective ones of the combinations, and based on the comparison, developing a conclusion as to cause of anomaly in the signal combination, and developing a corresponding response to the signal combination.

19. A method as in claim 1, the manufacturing operation comprising a manufacturing line having a plurality of work stations, and wherein the first and second replications are taken at a common such work station.

20. A method as in claim 1, the manufacturing operation comprising a manufacturing line having a plurality of work stations, and wherein the second replication is taken at a work station downstream of the work station at which the first replication is taken.

21. A method as in claim 1, the manufacturing operation fabricating units of goods, the method further comprising so analyzing sequential ones of the units of goods.

22. A method of measuring a parameter of goods during fabrication of such goods in a manufacturing operation, the method comprising:

(a) establishing a target parameter to be measured on respective units of the goods, and acceptable conditions of the target parameter;

(b) developing a measurement strategy for measuring the target parameter;

(c) detecting, in real time, the target parameter in a unit of the goods at a given stage of development of the target parameter on the goods, with respective at least first and second separate and distinct sensors, and thereby developing respective at least first and second separate and distinct real time replicate determination signals representative of the target parameter in the unit of goods;

(d) subsequent to developing the measurement strategy, programming a user-programmable computer so as to utilize an analysis method computatively consistent with the measurement strategy to evaluate accuracy of the determination signals;

(e) transmitting the determination signals to the user-programmable computer so as to provide the computer with first and second separate and distinct determination signals; and (f) analyzing the determination signals in combination, in the user-programmable computer, for conformity of the unit of goods to the established acceptable conditions, utilizing the respective analysis method.

23. A method as in claim 22, including detecting the target parameter with respective at least first and second separate and distinct sensors for at least first and second parameters at respective duplicative sites on the unit of goods.

24. A method as in claim 23, including processing the determination signals so as to use first and second different analytical methods to analyze the determination signals representative of the respective first and second parameters.

25. A method as in claim 22, including detecting the target parameter in the unit of goods using respective at least first, second, and third separate and distinct sensors.

26. A method as in claim 25, processing of the determination signals comprising computing an average of the signals.

27. A method as in claim 25 wherein, when the analysis detects an out-of-calibration condition in one of the sensors, automatically recalibrating the out-of-calibration sensor.

28. A method as in claim 25 wherein, when the analysis detects inappropriate input from one of multiple independent sensors, automatically adjusting the analysis to a basis of one less sensor.

29. A method as in claim 28, including automatically implementing back-up inspection of goods associated with the inappropriate input from the one sensor.

30. A method as in claim 22 including detecting the target parameter in the unit of goods using respective at least first, second, and third separate and distinct sensors for at least first and second parameters at respective replication sites on the unit of goods.

31. A method as in claim 30, including processing the determination signals from the respective first and second parameters so as to use first and second different analytical methods to analyze the determination signals representative of the respective first and second parameters.

32. A method as in claim 22, including detecting the target parameter using first and second separate and distinct sensors selected from the group consisting of electric eye sensors, infrared sensors, motion sensors, temperature sensors, cameras, and light sensors.

33. A method as in claim 22, processing of the determination signals comprising determining the number of the signals, for the unit of goods, having common or nearly common signal duration.

34. A method as in claim 22, processing of the determination signals comprising computing a standard deviation based on the determination signals.

35. A method as in claim 22 wherein, when processing of the determination signals results in concluding that a given one of the determination signals is erroneous, the method includes modifying the signal combination to compensate for the erroneous signal.

36. A method as in claim 22, including comparing the signal combination to an existing database of signal combinations, and based on the comparison, developing a conclusion as to cause of anomaly in the signal combination, and developing a corresponding response to the signal combination.

37. A method as in claim 36, including transmitting the response as a control signal to a process controller controlling the manufacturing operation.

38. A method as in claim 22, including comparing the signal combination to an existing database of signal combinations, including a historical probability of the occurrence of respective ones of the combinations, and based on the comparison, developing a conclusion as to cause of anomaly in the signal combination, and developing a corresponding response to the signal combination.

39. A method as in claim 22, the manufacturing operation comprising a manufacturing line having a plurality of work stations, and wherein the first and second replications are taken at a common such work station.

40. A method as in claim 22, the manufacturing operation comprising a manufacturing line having a plurality of work stations, and wherein the second replication is taken at a work station downstream of the work station at which the first replication is taken.

41. A method as in claim 22, the manufacturing operation fabricating units of goods, the method further comprising so analyzing sequential ones of the units of goods.

42. A method of measuring a parameter of an absorbent article during fabrication of such absorbent article in a manufacturing operation manufacturing such absorbent articles, the method comprising:

(a) establishing a target parameter to be measured on respective units of the absorbent articles, and acceptable conditions of the target parameter;

(b) developing a measurement strategy for measuring the target parameter;

(c) detecting, in real time, the target parameter on a respective absorbent article at a given stage of development of the target parameter on the goods, with respective at least first and second separate and distinct sensors, and thereby developing respective at least first and second separate and distinct real time replicate determination signals representative of the target parameter on the respective absorbent articles;

(d) subsequent to developing the measurement strategy, programming a user-programmable computer so as to utilize an analysis method which enables user-programmable computer assessment of determination signals from determinors to evaluate accuracy of the determination signals;

(e) transmitting the determination signals to the user-programmable computer so as to provide the computer with first and second separate and distinct determination signals; and (f) analyzing the determination signals in combination, in the user-programmable computer, for conformity of the respective absorbent article to the established acceptable conditions, utilizing the respective analysis method.

43. A method as in claim 42, including detecting the target parameter with respective at least first and second separate and distinct sensors for at least first and second parameters at respective duplicative sites on the respective absorbent article.

44. A method as in claim 43, including processing the determination signals so as to use first and second different analytical methods to analyze the determination signals representative of the respective first and second parameters.

45. A method as in claim 42, including detecting the target parameter in the respective absorbent article using respective at least first, second, and third separate and distinct sensors.

46. A method as in claim 45, processing of the determination signals comprising computing an average of the signals.

47. A method as in claim 45 wherein, when the analysis detects an out-of-calibration condition in one of the sensors, automatically recalibrating the out-of-calibration sensor.

48. A method as in claim 45 wherein, when the analysis detects inappropriate input from one of multiple independent sensors, automatically adjusting the analysis to a basis of one less sensor.

49. A method as in claim 48, including automatically implementing back-up inspection of goods associated with the inappropriate input from the one sensor.

50. A method as in claim 42, including detecting the target parameter in the respective absorbent article using respective at least first, second, and third separate and distinct sensors for at least first and second parameters at respective replication sites on the respective absorbent article.

51. A method as in claim 50, including processing the determination signals from the respective first and second parameters so as to use first and second different analytical methods to analyze the determination signals representative of the respective first and second parameters.

52. A method as in claim 42, including detecting the target parameter using first and second separate and distinct sensors selected from the group consisting of electric eye sensors, infrared sensors, motion sensors, temperature sensors, cameras, and light sensors.

53. A method as in claim 42, processing of the determination signals comprising determining the number of signals, for the respective absorbent article, having common or nearly common signal duration.

54. A method as in claim 42, processing of the determination signals comprising computing a standard deviation based on the determination signals.

55. A method as in claim 42 wherein, when the analysis of the determination signals results in concluding that a given one of the determination signals is erroneous, the method includes modifying the signal combination to compensate for the erroneous signal.

56. A method as in claim 42, including comparing the signal combination to an existing database of signal combinations, and based on the comparison, developing a conclusion as to cause of anomaly in the signal combination, and developing a corresponding response to the signal combination.

57. A method as in claim 56, including transmitting the response as a control signal to a process controller controlling the manufacturing operation.

58. A method as in claim 42, including comparing the signal combination to an existing database of signal combinations, including a historical probability of the occurrence of respective ones of the combinations, and based on the comparison, developing a conclusion as to cause of anomaly in the signal combination, and developing a corresponding response to the signal combination.

59. A method as in claim 42, the manufacturing operation comprising a manufacturing line having a plurality of work stations, and wherein the first and second replications are taken at a common such work station.

60. A method as in claim 42, the manufacturing operation comprising a manufacturing line having a plurality of work stations, and wherein the second replication is taken at a work station downstream of the work station at which the first replication is taken.

61. A method as in claim 42, the manufacturing operation fabricating absorbent articles units, the method further comprising so analyzing sequential ones of the absorbent articles.

62. A method of measuring a parameter of an absorbent article during fabrication of such absorbent article in a manufacturing operation manufacturing such absorbent articles, the method comprising:

(a) establishing a target parameter to be measured on respective units of the absorbent articles, and acceptable conditions of the target parameter;

(b) detecting, in real time, the target parameter on a respective absorbent article at a given stage of development of the target parameter on the goods, with respective at least first and second separate and distinct sensors, and thereby developing respective at least first and second separate and distinct real time replicate determination signals representative of the target parameter on the respective absorbent article;

(c) transmitting the determination signals to a controller so as to provide the controller with first and second separate and distinct determination signals; and (d) analyzing the determination signals in combination, in the controller, for conformity of the respective absorbent article to the established acceptable conditions, utilizing an analysis method other than averaging the respective determination signals, wherein such analysis method is capable of assessing accuracy of determinor sensory input pertaining to the target parameters.

63. A method as in claim 62, including detecting the target parameter with respective at least first and second separate and distinct sensors for at least first and second parameters at respective duplicative sites on the respective absorbent article.

64. A method as in claim 63, including processing the determination signals so as to use first and second different analytical methods to analyze the determination signals representative of the respective first and second parameters.

65. A method as in claim 62, including detecting the target parameter in the respective absorbent article using respective at least first, second, and third separate and distinct sensors.

66. A method as in claim 65 wherein, when the analysis detects an out-of-calibration condition in one of the sensors, automatically recalibrating the out-of-calibration sensor.

67. A method as in claim 65 wherein, when the analysis detects inappropriate input from one of multiple independent sensors, automatically adjusting the analysis to a basis of one less sensor.

68. A method as in claim 67, including automatically implementing back-up inspection of goods associated with the inappropriate input from the one sensor.

69. A method as in claim 62, including detecting the target parameter in the respective absorbent article using respective at least first, second, and third separate and distinct sensors for at least first and second parameters at respective replication sites on the respective absorbent article.

70. A method as in claim 69, including processing the determination signals from the respective first and second parameters so as to use first and second different analytical methods to analyze the determination signals representative of the respective first and second parameters.

71. A method as in claim 62, including detecting the target parameter using first and second separate and distinct sensors selected from the group consisting of electric eye sensors, infrared sensors, motion sensors, temperature sensors, cameras, and light sensors.

72. A method as in claim 62, processing of the determination signals comprising determining the number of the signals, for the respective absorbent article, having common or nearly common signal durations.

73. A method as in claim 62, processing of the determination signals comprising computing a standard deviation based on the determination signals.

74. A method as in claim 62 wherein, when the analysis of the determination signals results in concluding that a given one of the determination signals is erroneous, the method includes modifying the signal combination to compensate for the erroneous signal.

75. A method as in claim 62, including comparing the signal combination to an existing database of signal combinations, and based on the comparison, developing a conclusion as to cause of anomaly in the signal combination, and developing a corresponding response to the signal combination.

76. A method as in claim 75, including transmitting the response as a control signal to a process controller controlling the manufacturing operation.

77. A method as in claim 62, including comparing the signal combination to an existing database of signal combinations, including a historical probability of the occurrence of respective ones of the combinations in such absorbent articles, and based on the comparison, developing a conclusion as to cause of anomaly in the signal combination, and developing a corresponding response to the signal combination.

78. A method as in claim 62, the manufacturing operation comprising a manufacturing line having a plurality of work stations, and wherein the first and second replications are taken at a common such work station.

79. A method as in claim 62, the manufacturing operation comprising a manufacturing line having a plurality of work stations, and wherein the second replication is taken at a work station downstream of the work station at which the first replication is taken.

80. A method as in claim 62, the manufacturing operation fabricating units of goods, the method further comprising so analyzing sequential ones of the units of the goods.

* * * * *

UNITED STATES PATENT AND TRADEMARK OFFICE
CERTIFICATE OF CORRECTION

PATENT NO. : 6,253,159 B1
DATED : June 26, 2001
INVENTOR(S) : Thomas A. Bett et al.

It is certified that error appears in the above-identified patent and that said Letters Patent is hereby corrected as shown below:

Title page,
Item [57], ABSTRACT, line 8, delete "determinator" and substitute -- determinor --.

Column 1,
Line 19, delete "process", and substitute -- processing --.
Line 28, delete "absorber", and substitute -- absorbent --.

Column 2,
Line 16, delete "turn", and substitute -- torn --.

Column 3,
Line 31, delete "system", and substitute -- systems --.
Line 34, delete "system", and substitute -- systems --.
Line 44, delete "confirm", and substitute -- conform --.

Column 4,
Line 18, delete "a limitation of automatic inspection and control system", and substitute -- A limitation of automatic inspection and control systems --.
Line 26, delete "extended", and substitute -- extent --.

Column 5,
Line 30, delete "embodiment", and substitute -- embodiments --.

Column 6,
Line 8, delete "manufacturer", and substitute -- manufacturing --.

Column 7,
Line 16, delete "embodiment", and substitute -- embodiments --.
Line 50, delete "one", and substitute -- on --.

Column 9,
Line 2, delete "option", and substitute -- output --.
Line 52, delete "is", and substitute -- can --.

UNITED STATES PATENT AND TRADEMARK OFFICE
CERTIFICATE OF CORRECTION

PATENT NO. : 6,253,159 B1
DATED : June 26, 2001
INVENTOR(S) : Thomas A. Bett et al.

It is certified that error appears in the above-identified patent and that said Letters Patent is hereby corrected as shown below:

Column 12,
Line 9, delete "the", and substitute -- then --.
Line 19, delete "waste", and substitute -- waist --.
Line 34, delete "or", and substitute -- of --.

Column 14,
Line 67, delete "some", and substitute -- other --.

Signed and Sealed this

Fourteenth Day of May, 2002

Attest:

JAMES E. ROGAN
*Director of the United States Patent and Trademark Office*

*Attesting Officer*